Patented July 10, 1934

1,965,880

UNITED STATES PATENT OFFICE 1,965,880

PROCESS OF RECOVERING METAL VALUES FROM LEAD BEARING MATERIALS

John H. Calbeck, Joplin, Mo.

Application December 15, 1930, Serial No. 502,420

12 Claims. (Cl. 23—71)

This invention relates to a process for recovering lead and lead compounds from lead bearing material and more particularly to a chemical process for producing lead products.

The principal objects of the invention are to lower the cost of producing white lead and similar products of relatively high quality, and to improve the quality of lead products obtained from relatively impure materials.

Further particular objects of the invention are to recover lead values in relatively pure form from waste materials and to recover valuable constituents of the materials which represent impurities with respect to lead.

In one aspect, the invention comprises the treatment of lead bearing material, for example battery scrap, with a solvent including acetic acid to recover valuable incidental constituents such as antimony and produce a lead liquor of high purity, treating the lead liquor preferably chemically to recover lead products, and reconditioning the solution to act again on waste material.

A particular feature of the invention includes the maintenance of the hydrogen ion concentration of a solution within a predetermined range, whereby the quality of the product and the efficiency of the process are improved.

Figure 1:
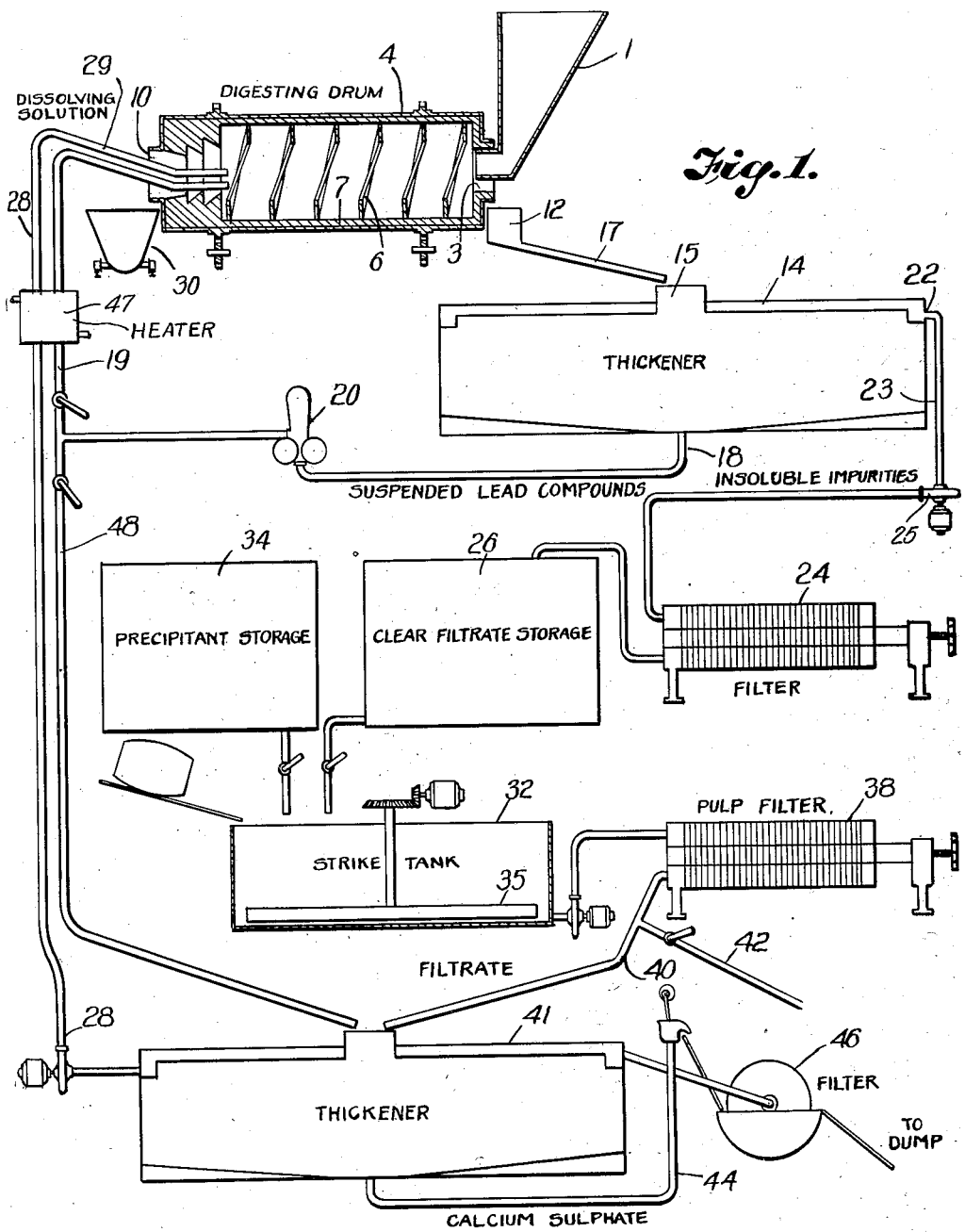
Figure 2:
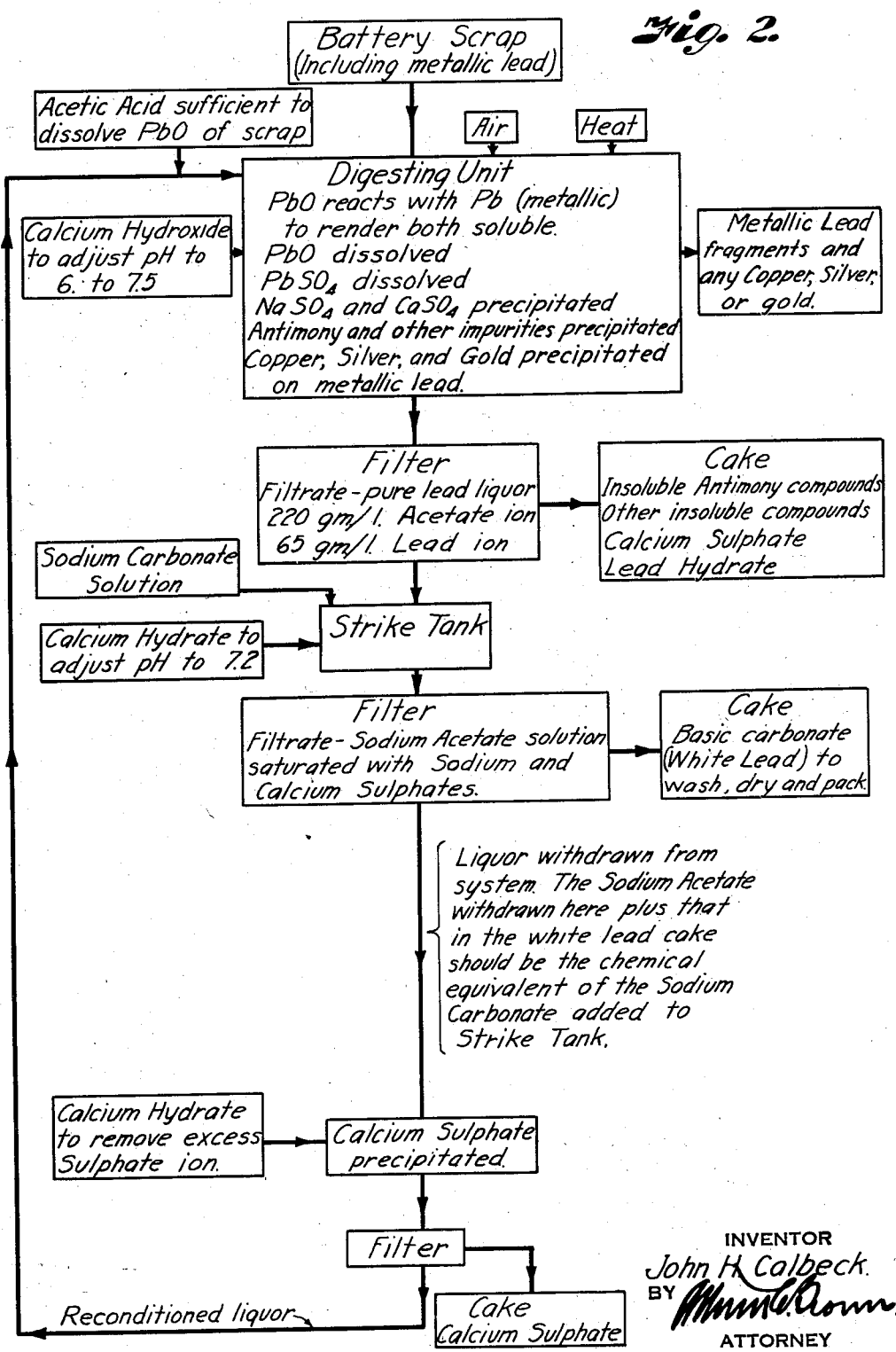

Other features and objects of the invention will appear in the description of apparatus whereby the process may be carried out, and illustrated in the accompanying drawings wherein:

Fig. 1 is a diagrammatic view partly in section of an apparatus for carrying out my improved process; and Fig. 2 illustrates a flow sheet diagrammatically showing the steps of the process.

For clarity the process will first be described as applied to the recovery of antimony and basic lead carbonate from waste material such as storage battery scrap.

The scrap is separated from refuse such as rubber, wood, iron and non-plumbiferous metals, and supplied to a hopper 1 having a horizontally directed discharge elbow or spout located in a relatively large axial feed opening 3 in one end of a revoluble wood-lined digesting drum 4.

The scrap may be fed continuously from the hopper into the drum. Spiral flights 6 are attached to the drum lining so that as the drum revolves the charge of scrap is slowly worked from the feed end toward an axial waste discharge opening 10 at the opposite end of the drum.

A dissolving solution adapted to react with components of the scrap to form lead acetate is introduced continuously through the discharge opening 10 into the drum to travel toward the feed opening 3 and extract components of the material. The resulting solution carrying solid particles overflows through said opening into a sump 12 for movement to a thickener 14 having a central top inlet 15. The transfer of material from the sump to the thickener tank may be effected by gravity flow thereof through a trough or conduit 17.

The thickener 14 comprises a circular settling tank so designed as to diameter that suspended lead compounds that may have been carried over from the digesting drum will settle to the sloping bottom and may be returned to the drum through pipes 18 and 19, by means of a pump 20.

The design of the tank 14 also provides that the lighter fraction of the suspended material including insoluble impurities such as antimony, tin, manganese and the like will overflow with the solution at 22 and pass through a conduit 23 to a filter 24, flow being promoted by a pump 25 in the conduit.

The clear filtrate from the filter 24 comprises a strong purified lead liquor and is pumped to a clean filtrate storage tank 26. The filter cake from said filter contains metallic impurities together with some lead, and may be smelted to recover metallic values. When the material being treated consists of battery plates, the filter cake smelts down to antimonial lead containing as high as 22 per cent antimony.

The digesting drum 4 and the thickener tank 14 thus comprise a digesting unit to prepare the clear lead solution from which lead products may be recovered.

The dissolving solution is reconditioned after use in each cycle of operations, and is circulated continuously, the drawings therefore illustrating a conduit 28 having a discharge end 29 located in the waste discharge opening of the leaching drum, and an oposite end communicating with a source of reconditioned solution, as later described.

The dissolving solution as delivered to the digesting drum includes acetic acid, and also in the aspect of the invention now being described includes one or more acetates of metals other than lead, such as the acetates of potassium, calcium, ammonium, barium, magnesium and zinc, and chiefly sodium acetate. An important feature of my invention consists in the use of practically as high percentages of the acetates of other metals as of lead acetate in the clear lead solution, whereas heretofore lead acetate liquors used for similar purposes have contained a relatively small percentage of other salts in solution.

The drum is revolved slowly so that by the time the charge has worked to the discharge end all the soluble material has been dissolved and only insoluble material and undissolved lead fragments are discharged therefrom into a suitable receiver such as a cart 30. When battery plates are being charged the fragments collected in the cart and consisting of about 7.5 per cent antimonial lead may be washed free of entrained liquor, melted, and cast into pigs.

Special conditions are maintained in the digesting unit, and several reactions having novel significance occur therein that will now be described.

The lead sulphate and lead monoxide components of the material moving through the digesting drum 4 are dissolved at once by the strong solution of sodium acetate and acetic acid.

The material contains, however, in the aspect of the invention being described, quantities of lead peroxide and higher oxides of lead that are not soluble in acetate liquors. I have found that by maintaining an excess of metallic lead fragments in contact with the insoluble peroxide the peroxide is reduced, together with an equivalent weight of the metallic lead. Equal quantities of lead peroxide and metallic lead are thus put into solution in the digesting drum. I preferably therefore maintain sufficient volume of metallic lead in the digesting drum to assure reduction of all lead peroxide and higher oxides of lead to lead monoxide and thus render said oxides soluble in the acetate. The reduction is effected by local electrolytic action between metallic lead and the higher oxides.

The large volume of metallic lead fragments also effects precipitation of copper and precious metals from solution.

Air may be introduced into the drum to promote the dissolution of larger amounts of metallic lead than results from the reactions whereby the higher lead oxides are reduced.

In case of deficiency or absence of metallic lead in the drum, lead peroxide may be reduced by other reducing agents, for example lead sulphide, added either in small quantities in the form of soluble sulphides such as sodium sulphide, or in the form of finely ground natural sulphide ores.

The dissolving solution is introduced continuously into the leaching drum at such a rate that by the time it has traveled the length of the drum it has become saturated with reference to lead and sulphate ions, and will carry particles in suspension to the thickener tank 14 for gravity separation of suspended lead and movement of the solution to the filter.

I have found that when the hydrogen ion concentration or pH values greater than 6, are obtained in the solution prior to filtration, metals including antimony, arsenic, tin, manganese, iron, nickel, cobalt and bismuth, may be removed from the solution, and that the preferable value of the liquor as it overflows the thickener tank is between 6.5 and 7.5 pH units.

The effect of maintaining the pH value above the low limit stated, is to render said metals insoluble in the solution and if such metals are present in the material they will be collected in the filter 24.

Correction and adjustment of the pH value of the solution is preferably accomplished by the addition of a suitable base such as lime at an appropriate place in the system, for example adding lime to the clarified solution prior to delivery thereof to a precipitating zone, as later described.

The lead acetate solution is preferably passed over a quantity of sponge lead for removing copper and precious metals therefrom.

Insoluble impurities, particularly those rendered insoluble as above described, may be almost colloidal in character, and filter with difficulty. In the presence of a flocculent material such as lead hydrate a crystal clear filtrate may be obtained, and care is taken to provide such material in the solution before it has passed into the filter, to assure complete removal of impurities.

The filtrate is delivered in measured quantities from the storage tank 26 to a strike tank 32 and a precipitant solution stored in a tank 34 is added slowly to the charge of filtrate while the charge is stirred vigorously by the agitator 35.

The precipitant solution should be as concentrated as possible for the temperature at which it is to be used. In the precipitation of basic carbonate white lead a saturated solution of sodium carbonate at 120° F. is preferred.

The insoluble lead compound is precipitated as rapidly as the precipitant is added. After the precipitation is completed the batch should be stirred for a sufficient time to assure separation and render the pulp easily filterable, an hour's stirring being preferred in the production of basic carbonate of lead. The pulp is then pumped to a filter 38 for collecting the white lead which may then be washed, dried, and made ready for market in the usual way. Spent liquor passes from the filter through a pipe 40 to a thickener tank 41.

Attention is here called to the formation of acetic acid, and to the tendency toward reduction in the pH value of solution, during the process of precipitation, when an ordinary lead acetate solution is employed.

I have found that lead compounds precipitated under conditions of constant pH value possess a uniformity of particle size and a freedom from colloidal matter, and when used as pigments, the compounds have a hiding power, color strength, and hiding properties, not obtainable otherwise.

Furthermore, I have found that in the case of basic carbonate white lead, the pH of the solution controls the chemical composition of the precipitate, and that to obtain a basic carbonate of the most desirable composition for use as a pigment, i. e. 80 per cent lead, a pH of approximately 7.2 per cent should be had at the end of the precipitation.

I have found that when the reactions in the strike tank are carried out in the presence of a buffer salt, the pH value of the solution changes but slightly during the precipitation, that is to say, the slurry of precipitate and liquor at the end of the precipitation has substantially the same pH value as the lead acetate liquor at the beginning of the precipitation.

I therefore provide for the presence of a buffer salt comprising a non-plumbiferous metal acetate, such as sodium acetate, in the acid solution in the strike tank to inhibit dissociation or ionization of the acetic acid in the tank during precipitation, and preferably make such provision by employing a high concentration of the acetate of metal other than lead in the digesting unit.

It so happens that the range of pH values of the dissolving solution at which the antimony compounds are most insoluble is identical with that required for the solution in the strike tank for the precipitation of basic carbonate white lead, namely from 6.5 to 7.2 units.

The auxiliary acetate or buffer salt, for example sodium acetate, therefore has not only the advantages of being a good solvent for lead sulphate, and of lending itself to the removal of antimony and other impurities from solution, but also has the advantage of maintaining an almost constant pH value during the period of precipitation.

The composition of the lead liquor or solution prior to precipitation preferably comprises the following members in the proportions given:

|  | Grams per liter |
|---|---|
| Lead ion | 65 |
| Sodium ion | 75 |
| Calcium ion | 4 |
| Acetate ion | 220 |
| Sulfate ion | 17 |

The hydrogen ion concentration or pH value of the above solution being 6.5 to 7.2.

I have used successfully solutions containing no more than 150 grams total acetate per liter, and therefore do not wish to be understood as limiting the composition of the solution to a strict formula. I prefer a solution having the concentration above given since it not only has enough excess acetate salts in solution to give the precipitated pigment the desired physical properties, but it also has ample dissolving power for use in digesting.

A suitable base, for example hydrated lime may be added to the solution in the precipitation or strike tank 32, to correct the pH value of the solution, only relatively small quantities being called for to effect such adjustment.

Referring now to the description of apparatus and process at the end of the precipitation and filtering steps, the spent liquors, i. e. the filtrate from the filter 38, are reconditioned and returned to the digesting tank for reuse as presently described.

In the aspect of the invention now being described, providing for production of basic lead carbonate and use of sodium acetate, an excess of sodium ion will accumulate in the system and impair the solvent power of the liquor and also interfere with control of pH values. In order to remove the excess of sodium ion, and adjust the sodium ion-acetate ion ratio, a suitable amount of spent liquor is first withdrawn through a bleeder pipe 42 connected to the pipe 40, thus bringing about a shortage of acetate ion in the system. This shortage is made up by the addition of acetic acid which may be introduced into a stream of spent liquor moving to the tank 41. The withdrawn liquor should be evaporated to recover the sodium acetate.

The stream of spent liquor moving to the tank 41 should now have the same sodium ion-acetate ion ratio as the strong liquor normally employed for treating waste material in the digesting unit, but will have an excess of sulphate ion. Treatment of the solution with a suitable alkaline earth metal base such as lime is therefore provided for, to effect reduction of the sulphate ion concentration.

The quantity of hydrated lime that may have been added to the solution at the time of precipitation to correct the pH value would not cause precipitation of calcium sulphate, and additional amounts of an alkaline earth metal base are therefore introduced to the stream of spent liquor passing into the tank 41. Part of the sulphate ion is thus precipitated as sulphate of the alkaline earth, metal base employed, for example as sulphate of lime. The precipitated calcium sulphate settles out and is withdrawn through the pipe 44 filtered over the filter 46, and discarded.

The readjusted spent liquor overflows the tank 41 and is pumped through the pipe 28 and a heater 47 back to the digesting drum 4.

The digesting is best accomplished at temperatures of 160° to 200° F., and the heater may control the temperature of the solution in the digesting unit, by heating both the returned readjusted solution and the lead compounds pumped back to the tank through the pipes 18 and 19.

Part of the calcium sulphate is carried over to the digesting drum, and is not precipitated until the solution begins to dissolve lead in the digesting system. Calcium sulphate accumulating in the leaching system is removed periodically by pumping from the bottom of the thickener tank 14 to thickener tank 41, for example, through the pipe 18 and a valved branch pipe 48. The calcium sulphate and heavy lead material are then extracted in the tank 41 to remove all soluble lead, and the insoluble residue and calcium sulphate are pumped out and discarded or collected.

The process above described for producing basic carbonate white lead may be varied to produce lead chromate, by substituting sodium dichromate for sodium carbonate as the precipitant, in each instance sodium acetate and acetic acid resulting from the reactions, and being contained in the filtrate after the insoluble compounds have been filtered off, and readjustment of sodium ion-acetate ion ratio being required and provided for.

A third adaptation of the process consists in the use of arsenic acid as the precipitant, to produce lead arsenate, and no readjustment of sodium and acetate ions will be necessary.

A fourth adaptation of the process consists in the removal of the excess sulphate ion by concentration and/or refrigeration of the liquor moving to tank 41. Thereby the use of any calcium ion in the system is eliminated which may be desirable if a product containing no calcium as an impurity is desired. The solution may be concentrated and/or cooled so that sodium sulphate will be precipitated in tank 41, removed by filter 46 and recovered. Sometimes an hydrous sodium sulphate is thrown out of solution in the digesting drum by the lead sulphate and the removal of excess sulphate ion may be effected there or in tank 41. When sulphate ion is removed in this manner some of the excess sodium ion is removed also and the amount that it is necessary to remove through pipe 42 is reduced.

The lead hydrate above referred to for promoting removal of insoluble impurities, may comprise lead hydrate normally present in the solution, and formed to a slight extent when the pH value of the solution is brought to the value of 7.0. The adjustment of the pH value thus further favorably affects the efficiency of the process. The range of pH values recommended is that in which antimony is best precipitated, and is the more favorable because tin, arsenic, bismuth and manganese are also precipitated in such a range.

The dissolving solution originally supplied to the digesting drum contains not more than 50 grams of free acetic acid per liter, and sufficient acetates of metals other than lead to bring the total acetate per liter up to 150 grams, for example, 50 grams of free acetic acid and 100 grams of other acetates including sodium acetate.

Sodium acetate has been found to be the best buffer and the best solvent for lead sulphate that can now be had at a satisfactory price, and its use is therefore designated as preferred.

Among the alternative usages that may be employed within the scope of this invention, is the addition of sodium hydrate as the corrective agent to maintain the desired pH value of the solution.

The acetic acid supplied to the solution to make up shortage of acetic ion, and an alkaline earth metal base supplied for precipitating sulphate ion, may be introduced into the conduit 40, or at the top of the thickener 41, inasmuch as the thickener acts both as an agitator and a thickener.

The process has been described as applied to the treatment of battery scrap, and is particularly adapted to such use. Other lead bearing materials may be treated by the process and produce lead compounds having high quality, however, for example waste materials such as residues from chamber acid plants, fumes and drosses from lead furnaces, lead sulphates such as lead sulphate residues from lithophone and electrolytic zinc plants, and lead oxides and sulphates prepared by roasting lead ores.

Any lead compound that can be precipitated or otherwise separated from a lead acetate solution may be produced by the above described process, the compounds of most present importance commercially being lead arsenate, lead chromate and basic lead carbonate.

A table showing the reactions occurring in the production of the three products mentioned is appended to more fully disclose the invention.

I. $3Pb(C_2H_3O_2)_2 + 2Na_2CO_3 + H_2O =$
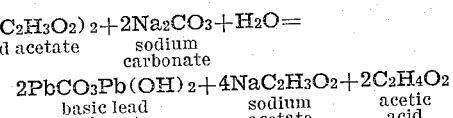
$2PbCO_3Pb(OH)_2 + 4NaC_2H_3O_2 + 2C_2H_4O_2$
basic lead carbonate — sodium acetate — acetic acid II. $2Pb(C_2H_3O_2)_2 + Na_2Cr_2O_7 + H_2O = 2PbCrO_4 +$
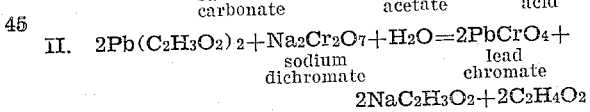
$2NaC_2H_3O_2 + 2C_2H_4O_2$ III. $3Pb(C_2H_3O_2)_2 + 2H_3AsO_4 = Pb_3(AsO_4)_2 +$
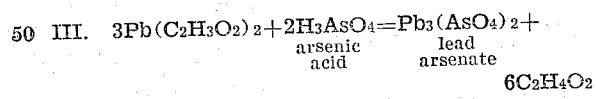
$6C_2H_4O_2$

What I claim and desire to secure by Letters Patent is:

1. The process of producing lead compounds which are normally insoluble in acetate solution from waste material containing lead, including digesting the material with acetic acid and an alkaline metal acetate to form a lead acetate solution containing a substantial proportion of alkaline metal acetate, treating the solution with lime to adjust the pH concentration between 6 and 7.5 to effect precipitation of metal compounds contained in the material that are insoluble at said concentration values, filtering the solution to remove said metal compounds, treating the filtrate with an alkali metal salt the anion of which forms an insoluble compound of lead precipitate in the solution, and filtering the solution to remove the precipitate.

2. The process of producing lead compounds which are normally insoluble in acetate solution from material containing lead and lead compounds including lead sulphate, including digesting the material with acetic acid and an alkaline metal acetate to form a lead acetate solution containing a substantial proportion of alkaline metal acetate, treating the solution with lime to adjust the pH concentration between 6 and 7.5 to effect precipitation of metal compounds contained in the material that are insoluble at said concentration values, filtering the solution to remove said metal compounds, treating the filtrate solution with an alkali metal salt the anion of which forms an insoluble compound of lead precipitate in the solution, filtering the solution to remove the precipitate, treating the filtered solution with an additional amount of lime to effect precipitation of any sulphate ion that is retained in the solution, removing the last named precipitate, treating the solution with an additional amount of acetic acid, and returning the solution for digesting another batch of the material.

3. The process of producing basic lead carbonate from material containing lead, including digesting the material with acetic acid and an alkaline metal acetate to form a lead acetate solution containing a substantial proportion of alkaline metal acetate, treating the solution with lime to adjust the pH concentration between 6 to 7.5 to effect precipitation of metal compounds contained in the material that are insoluble at said concentration values, filtering the solution to remove said metal compounds, treating the filtrate with an alkaline metal carbonate to effect precipitation of basic lead carbonate, and filtering the solution to remove the basic lead carbonate.

4. The process of producing basic lead carbonate from material containing lead including digesting the material with acetic acid and sodium acetate to form a lead acetate solution containing a substantial proportion of sodium acetate, treating the solution with lime to adjust the pH concentration between 6 to 7.5 to effect precipitation of metal compounds contained in said metal that are insoluble at said concentration values, filtering the solution to remove said metal compounds, treating the filtrate with an alkaline metal carbonate to effect precipitation of basic lead carbonate, and filtering the solution to remove the basic lead carbonate.

5. The process of producing lead compounds which are normally insoluble in acetate solution from waste material containing lead, including digesting the material with acetic acid and sodium acetate to form a lead acetate solution containing a subsantial proportion of sodium acetate, treating the solution with lime to adjust the pH concentration between 6 and 7.5 to effect precipitation of metal compounds contained in the material that are insoluble at said concentration values, filtering the solution to remove said metal compounds, treating the filtered solution with an alkaline metal salt the anion of which forms an insoluble compound of lead precipitate in the solution, filtering the solution to remove the insoluble lead precipitate, adding additional acetic acid to the solution to readjust the sodium ion and acetate ion ratio, and returning the readjusted solution to continue the digesting process.

6. The process of producing lead compounds which are normally insoluble in acetate solution from waste material containing lead and lead compounds including lead sulphate, including digesting the material with acetic acid and sodium acetate to form a lead acetate solution containing a substantial proportion of sodium acetate, treating the solution with lime to adjust the pH concentrate between 6 and 7.5 to effect precipitation of metal compounds contained in the material that are insoluble at said concentration values, filtering the solution to remove said metal compounds, treating the filtered solution with an alkaline metal salt the anion of which forms an insoluble compound of lead precipitate in the solution, filtering the solution to remove the insoluble lead precipitate, removing a portion of the spent solution containing substantially the same quantity of alkaline metal ion as has been added as alkaline metal salt, adding additional acetic acid to the remaining spent solution to readjust the sodium ion and acetate ion ratio, treating the spent solution with an additional amount of lime to effect precipitation of part of any sulphate ion which may be in the spent solution in the form of sulphate of lime, removing the sulphate of lime, and returning the readjusted solution to continue the digesting process.

7. The process of producing lead compounds which are normally insoluble in acetate solution from waste material containing lead, including digesting the material with acetic acid and an alkaline metal acetate to form a lead acetate solution containing a substantial proportion of alkaline metal acetate, treating the solution with lime to adjust the pH concentration between 6 and 7.5 to effect precipitation of metal compounds contained in the material that are insoluble at said concentration values, filtering the solution to remove said metal compounds, treating the filtrate with an alkali metal salt the anion of which forms an insoluble compound of lead precipitate in the solution, adding additional lime to adjust the pH concentration value at 7.2 during the last named reaction to enhance the quality of the resulting lead precipitate, and filtering the solution to remove the precipitate.

8. The process of producing basic lead carbonate from waste material containing lead, including digesting the material with acetic acid and an alkaline metal acetate to form a lead acetate solution containing a substantial proportion of alkaline metal acetate, treating the solution with lime to adjust the pH concentration between 6 to 7.5 to effect precipitation of metal compounds contained in the material that are insoluble at said concentration values, filtering the solution to remove said metal compounds, treating the filtrate with an alkaline metal carbonate to effect precipitation of basic lead carbonate, adding lime to the solution during the last named reaction to adjust the pH concentration value at 7.2 to enhance the quality of the resulting lead carbonate precipitate, and filtering the solution to remove the basic lead carbonate.

9. The method of producing lead compounds which are normally insoluble in an acetate solution from waste material containing lead, including digesting the material with acetic acid and an alkaline metal acetate in the presence of excess metallic lead fragments whereby lead peroxide and higher oxide components of the material are reduced to go into solution with soluble components of the material to form an acetate solution containing a substantial proportion of alkaline metal acetate, treating the solution with lime to adjust the pH concentration between 6 and 7.5 to effect precipitation of metal compounds formed in the solution which are not soluble at said concentration values, filtering the solution in the presence of lead hydrate to remove said compounds, treating the filtrate with an alkali metal salt the anion of which forms an insoluble compound of lead precipitate in the solution, and filtering the solution to remove the insoluble lead precipitate.

10. The method of producing basic lead carbonate from waste material, including digesting the material containing lead and lead compounds including lead sulphate with acetic acid and sodium acetate in the presence of excess metallic lead fragments whereby lead peroxide and higher oxide content of the material are reduced to go into solution with soluble components of the material to form an acetate solution containing a substantial proportion of sodium acetate, removing the insoluble components of the material from the solution, treating the solution with calcium hydroxide to adjust the pH concentration between 6 and 7.5 to effect precipitation of metal compounds formed in the solution which are not soluble at said concentration values, filtering the solution in the presence of lead hydrate to remove said metal compounds, treating the filtered solution with a sodium carbonate solution to effect precipitation of lead carbonate in the solution whereby the sodium acetate acts as a buffer salt during said precipitation, treating the solution with calcium hydroxide to adjust the pH concentration to 7.2, filtering the lead carbonate precipitate from the solution, removing a portion of the spent solution containing substantially the same quantity of alkaline metal ion as has been added as sodium acetate, adding additional acetic acid to the solution to readjust the sodium ion and acetate ion ratio, treating the spent solution with an additional amount of calcium hydrate to effect precipitation of part of any sulphate ion retained in the spent solution in the form of calcium sulphate and returning the readjusted solution for continuing digestion of the material.

11. The process of producing a basic carbonate of lead pigment including digesting a lead containing material with acetic acid and an alkaline metal acetate to form a solution of lead acetate containing the alkaline metal acetate equal in amount to the lead acetate, and treating the solution with carbonate of soda and a base to precipitate basic carbonate of lead pigment from the solution.

12. The process of producing a basic carbonate of lead pigment including digesting a lead containing material with acetic acid and an alkaline metal acetate to form a solution of lead acetate containing the alkaline metal acetate equal in amount to the lead acetate, treating the solution with carbonate of soda to effect precipitation of basic carbonate of lead pigment, and adding a base to the solution to adjust the pH concentration value at substantially 7.2 during the last named reaction to enhance the quality of the basic carbonate of lead pigment.

JOHN H. CALBECK.